BENNINGTON FULTON.
Improvement in Combined Bread Board and Dough Tray.

No. 119,926.  Patented Oct. 17, 1871.

Witnesses.  Inventor,
Jno. D. Patten  Bennington Fulton
Alonzo Hughes  By J. J. Johnston & Bro.
his attorneys

BENNINGTON FULTON.
Improvement in Combined Bread Board and Dough Tray.
No. 119,926.                      Patented Oct. 17, 1871.
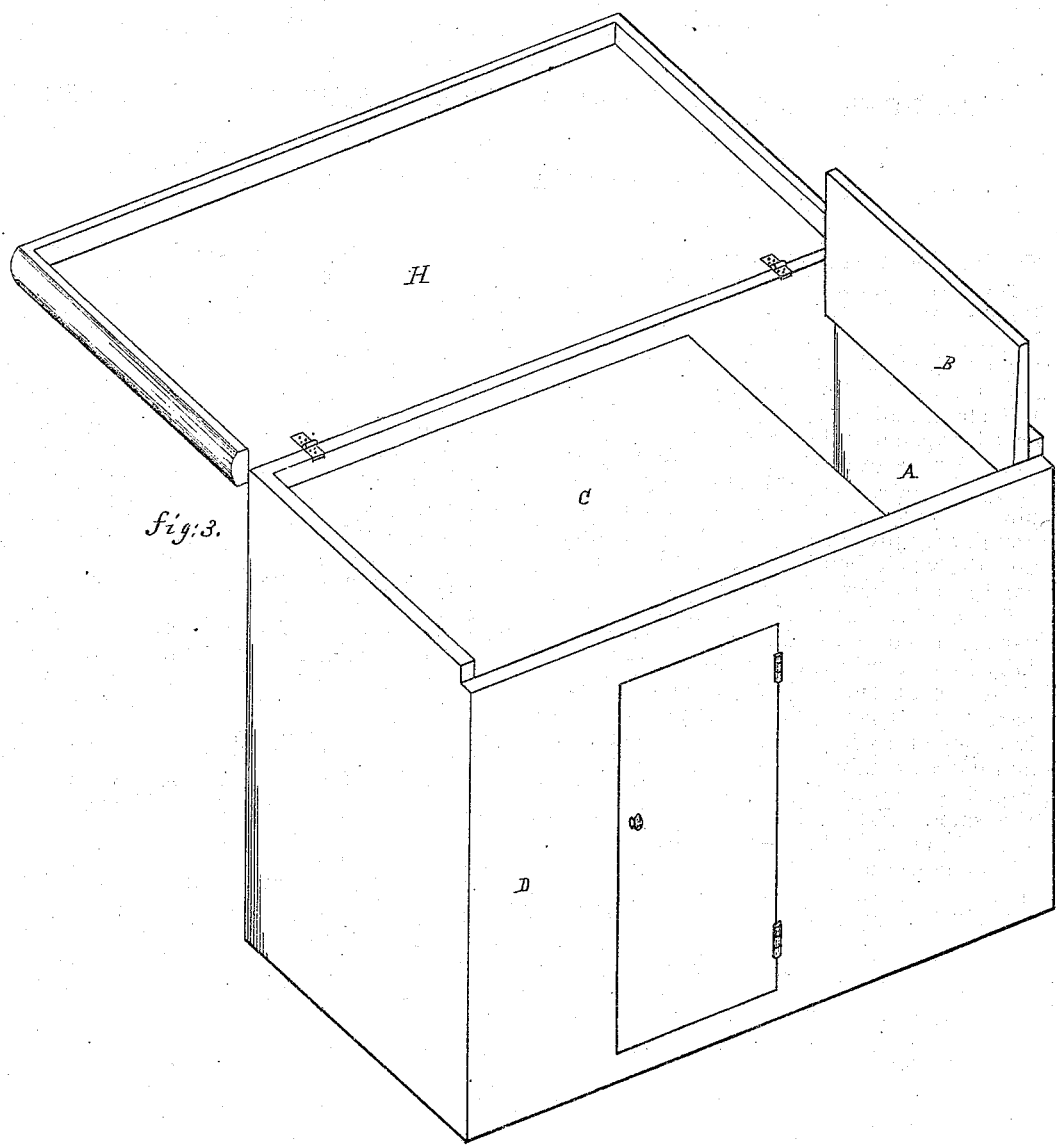

UNITED STATES PATENT OFFICE.

BENNINGTON FULTON, OF PULASKI, IOWA.

IMPROVEMENT IN COMBINED BREAD-BOARDS AND DOUGH-TRAYS.

Specification forming part of Letters Patent No. 119,926, dated October 17, 1871.

*To all whom it may concern:*

Be it known that I, BENNINGTON FULTON, of Pulaski, in the county of Davis and State of Iowa, have invented a new and useful Improvement in Bread-Board and Dough-Tray Combined; and I do hereby declare that the following is a full, clear, and exact description thereof, reference being had to the accompanying drawing and to the letters of reference marked thereon.

My invention consists in combining in one piece of household furniture a bread-board and dough-tray provided with a bread-raising chamber, the whole being constructed, arranged, and combined as hereinafter described.

To enable others skilled in the art to make and use my invention, I will proceed to describe more fully its construction and the operation.

Figure 1:
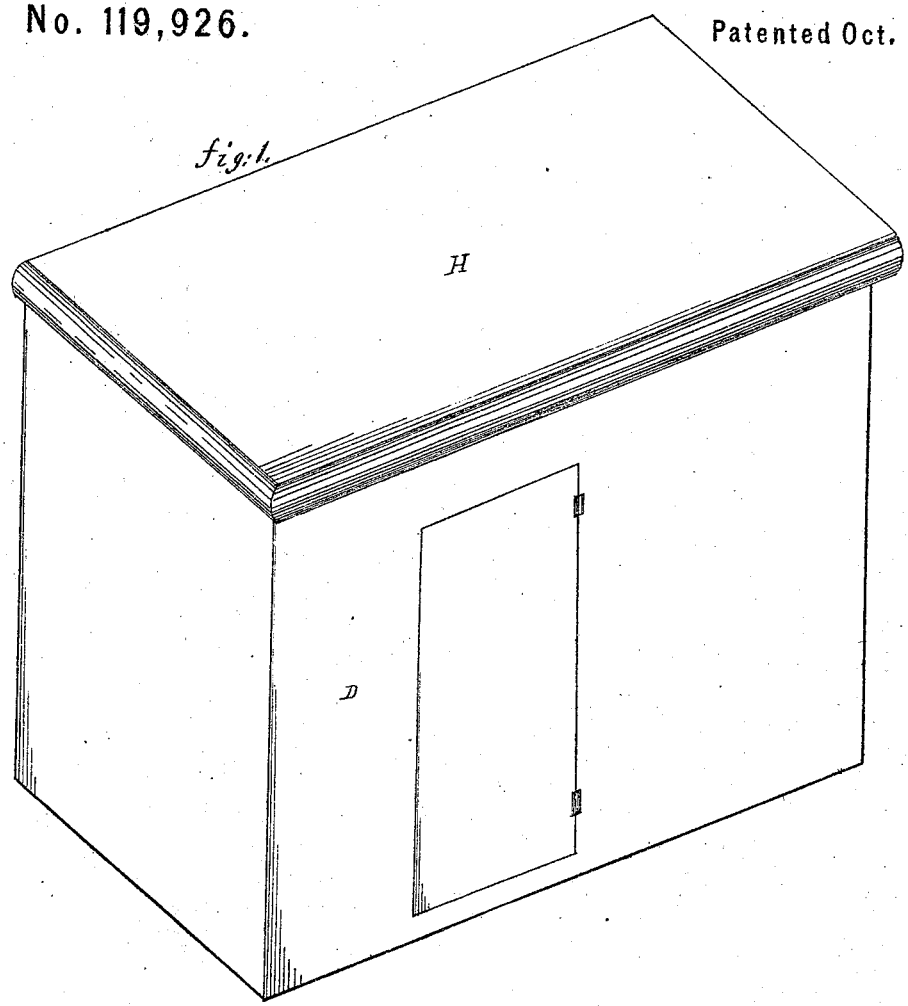
Figure 2:
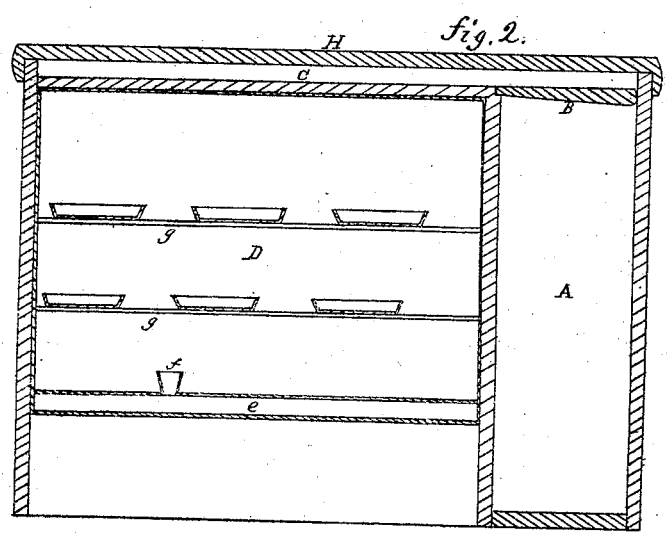

In the accompanying drawing which forms part of my specification, Figure 1 is a perspective view of my improvement in bread-board and dough-tray combined, representing it closed up. Fig. 2 is a vertical and longitudinal section of the same. Fig. 3, Sheet B, represents the lids when in position for working the dough.

A represents the dough-tray, in which the batch of dough is mixed. B is the lid of the dough-tray. C is the table upon which the dough is worked and divided into suitable parcels for loaves, which are placed in pans and set in the raising-chamber D, constructed of sheet-metal, (tin by preference,) and provided with a water-chamber, $e$, which is filled with water at $f$. Under this water-chamber is placed a lamp for heating the water in the chamber $e$, and thereby impart the desired temperature to the chamber D for raising the bread placed in it. $g$ are shelves for the pans; these shelves may be arranged to suit the taste and judgment of the maker or user. H represents a lid for closing up the whole, as shown in Fig. 1, and may be used as a table for the bread-pans, when it is in the position shown in Fig. 3.

The advantage of a bread-board and dough-tray combined, as hereinbefore described, will be very apparent to every good housewife.

What I claim as of my invention is—

A bread-board and dough-tray, provided with a raising-chamber, constructed, arranged, and combined as hereinbefore described.

BENNINGTON FULTON.

Witnesses:
   A. C. JOHNSTON,
   JAMES J. JOHNSTON. (88)